US010719508B2

(12) United States Patent
George (10) Patent No.: US 10,719,508 B2
(45) Date of Patent: Jul. 21, 2020

(54) DATA STORAGE SYSTEM FOR PROVIDING LOW LATENCY SEARCH QUERY RESPONSES

(71) Applicant: Risk Management Solutions, Inc., Newark, CA (US)

(72) Inventor: Christopher George, Erie, CO (US)

(73) Assignee: RISK MANAGEMENT SOLUTIONS, INC., Newark, CA (US)

( * ) Notice: Subject to any disclaimer, the term of this patent is extended or adjusted under 35 U.S.C. 154(b) by 271 days.

(21) Appl. No.: 15/957,779

(22) Filed: Apr. 19, 2018

(65) Prior Publication Data

US 2019/0325051 A1     Oct. 24, 2019

(51) Int. Cl.
*G06F 16/2453* (2019.01)
*G06F 16/22* (2019.01)
*G06F 16/23* (2019.01)
*G06F 16/182* (2019.01)
*G06F 16/21* (2019.01)

(52) U.S. Cl.
CPC ...... *G06F 16/24535* (2019.01); *G06F 16/182* (2019.01); *G06F 16/211* (2019.01); *G06F 16/221* (2019.01)

(58) Field of Classification Search
CPC ............ G06F 16/24535; G06F 16/211; G06F 16/221; G06F 16/182; G06F 16/2393; G06F 16/24539
USPC ....................................................... 707/713
See application file for complete search history.

(56) References Cited

U.S. PATENT DOCUMENTS

| | | | |
|---|---|---|---|
| 6,199,063 B1* | 3/2001 | Colby | G06F 16/24539 |
| 6,205,451 B1* | 3/2001 | Norcott | G06F 16/24539 |
| 6,366,905 B1* | 4/2002 | Netz | G06F 16/22 707/600 |
| 6,374,263 B1* | 4/2002 | Bunger | G06F 16/24539 |
| 6,484,159 B1* | 11/2002 | Mumick | G06F 16/2455 |

(Continued)

OTHER PUBLICATIONS

Wiewiorka et al., "Benchmarking distributed data warehouse solutions for storing genomic variant information", Database: The Journal of Biological Databasesand Curation, Jan. 1, 2017, pp. 1-16. (Year: 2017).*

(Continued)

*Primary Examiner* — Phuong Thao Cao
(74) *Attorney, Agent, or Firm* — Hickman Palermo Becker Bingham LLP (57) ABSTRACT

A method for providing low-latency responses to queries to a data search system comprises storing first digital data in a first digital data repository using a first column-oriented storage format; storing second digital data in a second digital data repository using a second column-oriented storage format, wherein the second column-oriented storage format is different from the first column-oriented storage format; generating a plurality of pre-computed views based on both the exposure data and the risk item data; storing the plurality of pre-computed views in the second data repository using the second column-oriented storage format; and in response to receiving a search query, determining a result set that is responsive to the query based on one or more particular pre-computed views of the plurality of pre-computed views and providing the result set to another computer or display device as output.

20 Claims, 4 Drawing Sheets

(56) References Cited

U.S. PATENT DOCUMENTS

| | | | | |
|---|---|---|---|---|
| 6,496,819 B1* | 12/2002 | Bello | G06F 16/24537 |
| 6,581,060 B1* | 6/2003 | Choy | G06F 21/6227 |
| | | | 707/694 |
| 7,110,999 B2* | 9/2006 | Colby | G06F 16/24539 |
| | | | 707/802 |
| 7,574,652 B2* | 8/2009 | Lennon | G06F 16/258 |
| | | | 715/248 |
| 7,644,361 B2* | 1/2010 | Wu | G06F 16/90324 |
| | | | 715/273 |
| 8,510,261 B1* | 8/2013 | Samantray | G06F 16/283 |
| | | | 707/602 |
| 8,799,207 B1* | 8/2014 | Stolte | G06F 16/283 |
| | | | 707/602 |
| 9,703,825 B2* | 7/2017 | Zhou | G06F 16/2393 |
| 10,007,686 B2* | 6/2018 | Lawande | G06F 16/221 |
| 10,120,898 B1* | 11/2018 | Betawadkar-Norwood | |
| | | | G06F 16/2455 |
| 10,303,786 B2* | 5/2019 | Kapse | G06F 16/221 |
| 10,437,807 B1* | 10/2019 | Brockington-Hill | |
| | | | G06F 16/2453 |
| 2001/0013030 A1* | 8/2001 | Colby | G06F 16/24539 |
| 2006/0047696 A1* | 3/2006 | Larson | G06F 16/2393 |
| 2006/0085465 A1* | 4/2006 | Nori | G06F 16/213 |
| 2006/0282424 A1* | 12/2006 | Larson | G06F 16/24535 |
| 2007/0239657 A1* | 10/2007 | Atur | G06F 16/283 |
| 2009/0228436 A1* | 9/2009 | Pasumansky | G06F 16/283 |
| 2010/0241644 A1* | 9/2010 | Jackson | G06F 16/2452 |
| | | | 707/760 |
| 2011/0055682 A1* | 3/2011 | Friedrich | G06F 40/177 |
| | | | 715/227 |
| 2011/0173132 A1* | 7/2011 | Abrams | G06Q 10/067 |
| | | | 705/348 |
| 2011/0218830 A1* | 9/2011 | Gonzalez | G06Q 10/10 |
| | | | 705/5 |
| 2013/0332487 A1* | 12/2013 | Ramesh | G06F 16/24539 |
| | | | 707/775 |
| 2013/0339370 A1* | 12/2013 | Holstege | G06F 16/2246 |
| | | | 707/743 |
| 2014/0172827 A1* | 6/2014 | Nos | G06F 16/2423 |
| | | | 707/722 |
| 2014/0281247 A1* | 9/2014 | Loaiza | G06F 16/22 |
| | | | 711/126 |
| 2014/0317084 A1* | 10/2014 | Chaudhry | G06F 16/24552 |
| | | | 707/713 |
| 2015/0112922 A1* | 4/2015 | Zhou | G06F 16/2393 |
| | | | 707/609 |
| 2015/0120698 A1* | 4/2015 | Plattner | G06F 16/283 |
| | | | 707/714 |
| 2015/0379299 A1* | 12/2015 | Klein | G06F 21/6227 |
| | | | 713/193 |
| 2016/0055225 A1* | 2/2016 | Xu | G06F 16/27 |
| | | | 707/624 |
| 2016/0147837 A1* | 5/2016 | Nguyen | G06F 16/22 |
| | | | 707/771 |
| 2016/0171070 A1* | 6/2016 | Hrle | G06F 16/273 |
| | | | 707/615 |
| 2016/0179887 A1* | 6/2016 | Lisonbee | G06F 16/9024 |
| | | | 707/718 |
| 2016/0328429 A1 | 11/2016 | Lipcon | |
| 2016/0335318 A1* | 11/2016 | Gerweck | G06F 16/2282 |
| 2016/0342654 A1* | 11/2016 | Bendel | G06F 16/24542 |
| 2017/0031975 A1* | 2/2017 | Mishra | G06F 16/2282 |
| 2017/0031976 A1* | 2/2017 | Chavan | G06F 16/23 |
| 2017/0098009 A1* | 4/2017 | Srinivasan | G06F 16/9024 |
| 2017/0116273 A1* | 4/2017 | Liu | G06F 16/24544 |
| 2017/0220685 A1* | 8/2017 | Yan | G06F 16/9535 |
| 2017/0293676 A1 | 10/2017 | Lowe et al. | |
| 2017/0371926 A1* | 12/2017 | Shiran | G06F 16/24524 |
| 2018/0046697 A1 | 2/2018 | Maciolek et al. | |
| 2018/0096006 A1* | 4/2018 | Das | G06F 16/2282 |
| 2018/0101547 A1* | 4/2018 | Greenfield | G16B 50/00 |
| 2019/0104175 A1* | 4/2019 | Balkesen | G06F 16/27 |
| 2020/0125566 A1* | 4/2020 | Scott | G06F 16/24535 |

OTHER PUBLICATIONS

Ledem, Julien, "Apache Arrow and Apache Parquet: Why We Need Different Projects for Columnar on Disk and In-Memory", dated Oct. 3, 2017, 7 pages.

Kornacker Marcel, "Introducing Apache Arrow: A Fast, Interoperable in Memory Columar Data Structure Standard—Cloudera Engineering Blog", dated Feb. 18, 2016, p. 2-5.

Karpathiotakis et al., "No Data Left Behind: Real-Time Insights from a Complex Data Ecosystem", CoCC dated Sep. 2017, 13 pages.

Jean-Marc Spaggiari et al., "Getting Started with Kudu: Perform Fast Analytics on Fast Data", dated Jul. 9, 2018, retrieved from google books.com, 1 page.

European Patent Office, "Search Report" in application No. 19170079. 8-1217, dated Aug. 7, 2019, 12 pages.

European Claims in application No. 19170079.8-1217, dated Aug. 2019, 5 pages.

The International Searching Authority, "Search Report" in application No. PCT/US19/28160, dated Jul. 18, 2019, 12 pages.

Current Claims in application No. PCT/US 19/28160, dated Jul. 2019, 4 pages.

* cited by examiner

DATA STORAGE SYSTEM FOR PROVIDING LOW LATENCY SEARCH QUERY RESPONSES

FIELD OF THE DISCLOSURE

The present disclosure is in the technical field of electronic digital data storage systems. The disclosure also is in the technical field of computer systems programmed for query processing and data storage, specifically data storage systems for providing low-latency responses to search queries.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

"Big data" describes a collection of data sets so large and complex that it becomes difficult to process using traditional database management tools or traditional data processing applications. Today, enterprise and data center applications demand increasingly large data sets be processed with minimal latency.

One consideration for data processing application deployments is configuring a database system for optimal query performance. A large data set may comprise hundreds of columns across billions of rows, and queries targeting the data set may include predicates on any column of the hundreds of columns. For example, insurance data may include hundreds of insurance portfolios, each of which comprise numerous insurance contracts, which in total cover hundreds of thousands of properties. Each property may include hundreds of attributes, such as address, regional information, soil type, structure type, and etc.

An example query may be a request to retrieve all properties located five miles from a coastline that have a wooden structure and sit on top of sandy soil. A typical database system may not be scalable to store this amount of data. Furthermore, such a request would take a significant amount of time to compute and provide results. Key-value data stores, such as Cassandra or HBase, may have better query processing times but cannot process queries that could have predicates on any data column.

Thus, a data processing system that accepts queries on any column of a large data set and provides search results without significant delay is desired.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

1.0 General Overview

Techniques are provided for a data search system that provides low-latency responses to search queries. A low-latency response may be a real-time, or close to real-time, response to a search query.

In an embodiment, first digital data is stored in a first digital data repository using a first column-oriented storage format. Second digital data is stored in a second digital data repository using a second column-oriented storage format that is different from the first column-oriented storage format. A plurality of pre-computed views is generated based on both the exposure data and the risk item data. The plurality of pre-computed views is stored in the second data repository using the second column-oriented storage format. In response to receiving a search query, a result set that is responsive to the query is determined based on one or more particular pre-computed views of the plurality of pre-computed views. The result set is provided to another computer or display device as output.

In an embodiment, a server system for providing low-latency query responses comprises a Kudu data repository, a Parquet data repository, and a plurality of Spark clustered computing instances managed by a Spark cluster manager.

Other embodiments, aspects, and features will become apparent from the disclosure as a whole.

2.0 Data Search System

Figure 1:
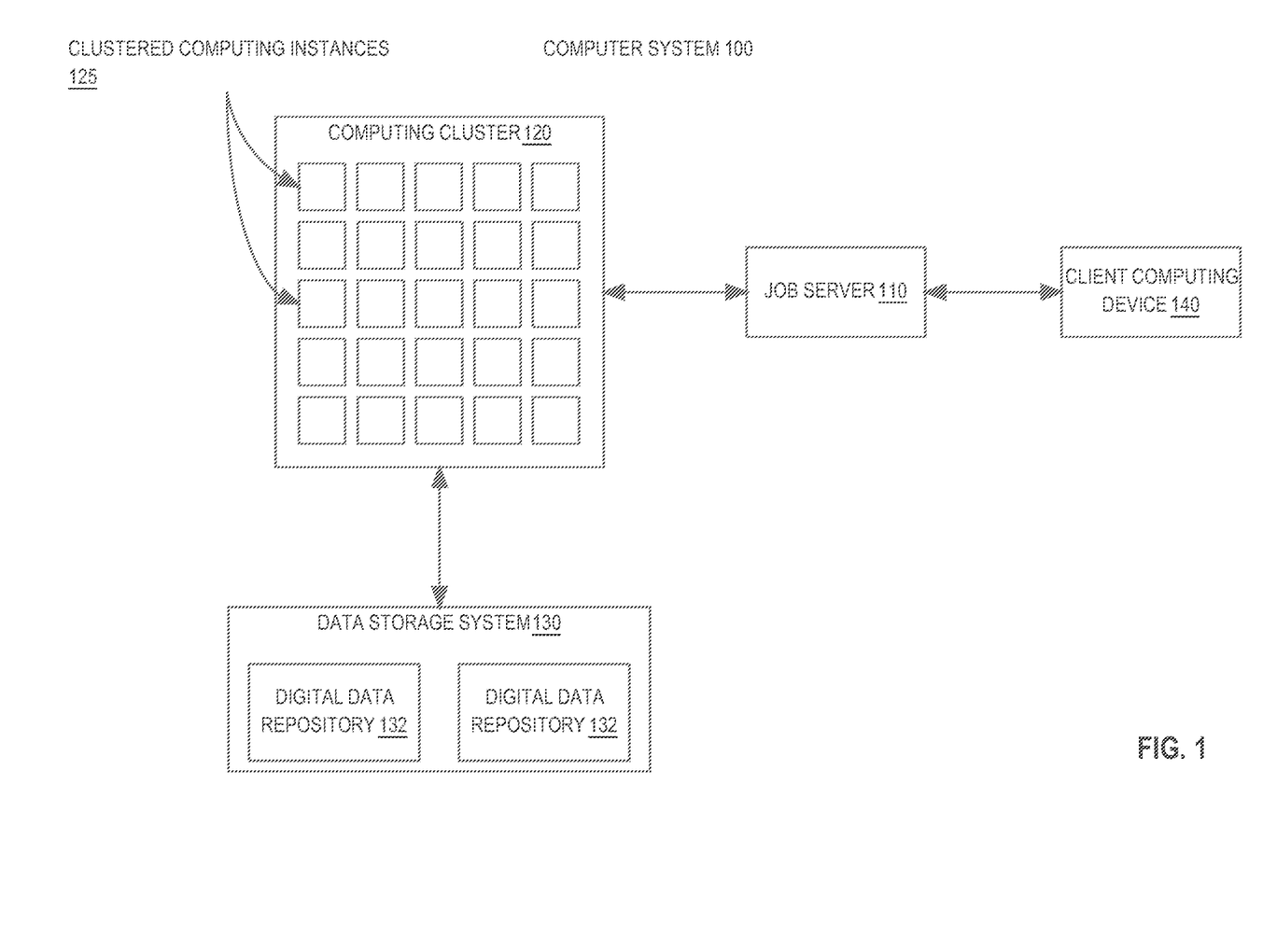
FIG. 1 illustrates an example computer system in which the techniques described may be practiced, according to one embodiment.

FIG. 1 illustrates an example computer system in which the techniques described may be practiced, according to one embodiment.

Computer system 100 comprises computing cluster 120, data storage system 130, and client computing device 140. Computing cluster 120, data storage system 130, and computing device 140 may be interconnected to one another using any suitable data communication mechanism such as one or more data networks. The one or more data networks may include one or more local area networks (LANs), one or more wide area networks (WANs), one or more internetworks such as the public Internet, or a company network.

2.1 Computing Cluster

Computing cluster 120 comprises a plurality of clustered computing instances 125. The clustered computing instances 125 may be interconnected via any suitable data network or communication mechanism including one or more LANs, one or more WANs, one or more internetworks, and the Internet.

In one embodiment, a clustered computing instance 125 is a server computer system comprised of commodity or readily-available hardware components running a server operating system such as a Microsoft Windows®-based, Unix-based, or Linux-based operating system for example. A clustered computing instance 125 may also be implemented by a virtual machine system or other software-based implementation of a computing device. In an embodiment, the clustered computing instances 125 are cloud computing instances such as EC2 instances, Compute Engine instances, or Azure instances, for example.

In an embodiment, each clustered computing instance 125 hosts or executes one or more big data processing frameworks for managing, processing, and/or analyzing large quantities of data. Example big data processing frameworks include Spark, Hadoop, Hive, Presto and Impala.

In an embodiment, the computing cluster 120 includes a cluster manager. In an embodiment, the cluster manager is programmed or configured to manage the plurality of clustered computing instances 125. Additionally or alternatively, the cluster manager may be programmed or configured to manage applications or services running on the plurality of clustered computing instances 125. The cluster manager may schedule tasks to be executed by the plurality of computing instances 125. Additionally, the cluster manager may allocate resources among the plurality of clustered computing instances 125.

The cluster manager may be executing on one or more of the clustered computing instances 125. Additionally or alternatively, a cluster manager may be executing on a computing device or computing instance separate from the plurality of clustered computing instances 125. The cluster manager may be, for example, a Spark standalone manager, Mesos, Kubernetes, YARN, or any other cluster manager suitable for managing the plurality of clustered computing instances 125.

2.2 Client Computing Device

Client computing device 140 may be any computing device, including but not limited to: servers, racks, work stations, personal computers, general purpose computers, laptops, Internet appliances, wireless devices, wired devices, multi-processor systems, mini-computers, and the like.

Client computing device 140 may execute a command line interface, a graphic user interface, or a REST endpoint to interact with the computing cluster 120. The interface and/or endpoint may be configured or programmed to provide a search query to the computing cluster 120 and receive a set of search results generated by computing cluster 120. In an embodiment, the set of search results may be stored in a data file provided to the client computing device 140 or in a data file accessible by the client computing device 140. Example data files include JSON, comma separated values, SQL dump, and other file types. Additionally or alternatively, the set of search results may be displayed at client computing device 140 using, for example, the command line interface or the graphical user interface.

2.3 Job Server

In the embodiment illustrated by FIG. 1, client computing device communicates with computing cluster 120 via a job server 110. Job server 110 provides an interface for submitting jobs to and/or managing job execution on the computing cluster 120. The interface may be a command line interface, graphical user interface, or a RESTful interface. In an embodiment, job server 110 may manage job execution for a plurality of computing clusters. Additionally or alternative a plurality of job servers may manage job execution for the same computing cluster, such as computing cluster 120. Job server 110 may comprise a computer or a software process executing on the same physical hardware, or virtual computing instance(s), that are used to implement other elements of the system.

In an embodiment, job server 110 is executing on one or more of the clustered computing instances 125. For example, job server 110 may be running on the same clustered computing instance as the cluster manager. Alternatively, job server 110 may be executing on a computing device or computing instance separate from the computing cluster 120.

In an embodiment, job server 110 manages client connections to the computing cluster 120. The client connections may be used to submit jobs, such as search queries, to the computing cluster 120. For example, the job server 110 may be a Spark Job Server managing one or more SparkContexts. In an embodiment, job server 110 may manage jobs for multiple types of clustered computing instances, such as one or more Spark, Mesos, Kubernetes and/or YARN instances.

In an embodiment, job server 110 is programmed or configured to manage one or more persistent client connections. Persistent client connection information may be stored in memory of one or more computing device executing the job server 110. The persistent client connections are not disconnected when jobs submitted to computing cluster 120 are completed. Rather, the persistent client connects continue running, and subsequent calls to computing cluster 120 may re-use one or more of persistent client connections. This avoids the overhead of starting a new client connection each time a client, such as client computing device 140, connects to the computing cluster 120.

In an embodiment, the one or more persistent client connections are used for processing search queries. Typically, big data frameworks such as Spark are used for batch processing rather than for providing real time responses to search queries. Since persistent client connections reduce the overhead of creating a client connection when a search query is submitted, the amount of time required to provide results to the search query is reduced. This enables low-latency searches to be performed.

In an embodiment, each persistent client connection is associated with a particular type of job and/or particular type of data access. Additionally, each persistent client connection may be associated with one or more particular clustered computing instances from the plurality of clustered computing instances 125 for handling the particular type of job.

As an example, a first set of one or more persistent client connections may be for batch jobs. Another set of one or more persistent client connections may be for accessing database management systems using, for example an ODBC or JDBC application programming interface. A third set of one or more persistent client connections may be for default, general use. Job server 110 may determine, based on the job received, which persistent client connection the job should use. For example, a batch processing job may use a first set of clustered computing instances associated with a first persistent client connection, while a search query may use a different set of clustered computing instances associated with a second persistent client connection. This prevents the search query from having to wait on the batch processing job to complete, or having to share computing resources with the batch processing job.

Figure 2:
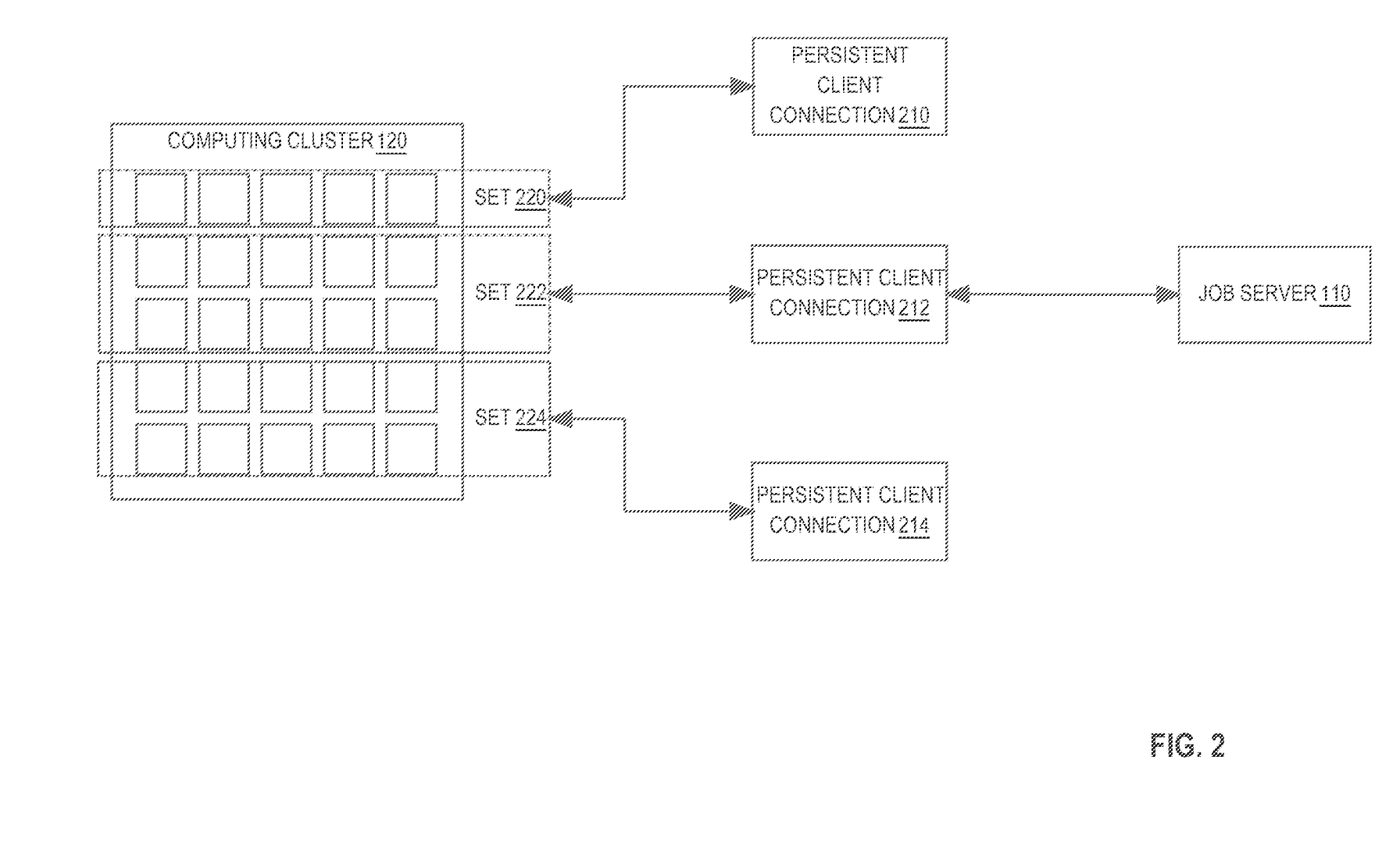
FIG. 2 illustrates an example job server managing persistent client connections, according to one embodiment.

FIG. 2 depicts a block diagram illustrating job server 110 managing a plurality of persistent client connections.

In an embodiment, the job server 110 is connected to persistent client connection 210, persistent client connection 212, and persistent client connection 214. Each persistent client connection is connected to a respective set of clustered computing instances in cluster 120. In the example illustrated in FIG. 2, persistent client connection 210 is connected to a first set of clustered computing instances 220, persistent client connection 212 is connected to a second set of clustered computing instances 222, and persistent client connection 214 is connected to a third set of clustered computing instances 224. Each persistent client connection may be used for a particular type of job. Jobs submitted through each persistent client connection may be run on clustered computing instances of the respective set of clustered computing instances.

2.4 Data Storage System

In an embodiment, data storage system 130 comprises programs and data that is stored on any suitable storage device such as one or more hard disk drives, memories, or any other electronic digital data recording device configured to store big data. Although data storage system 130 is depicted as a single device in FIG. 1, data storage system 130 may span multiple devices located in one or more physical locations. In an embodiment, data storage system 130 is a distributed file system or a distributed data store comprising a plurality of data nodes. For example, data storage system 130 may be a Hadoop Distributed File System (HDFS), MapR File System (MapR FS), HBase, or other suitable distributed data store.

Data storage system 130 may store a plurality of data repositories. Each data repository may store a different type of data. Additionally, the data stored in each data repository may be a different format.

In the example illustrated by FIG. 1, data storage system 130 comprises a first data repository 132 and a second data repository 134. As an example, assume the first data repository 132 stores restaurant information and the second data repository 134 stores a plurality of user restaurant reviews. The restaurant information may be stored using a first data storage format, and the user restaurant reviews may be stored using a second data storage format that is different from the first data storage format.

In an embodiment, each of the different data storage formats are column-oriented storage formats. Example column-oriented data storage formats include Parquet, Kudu, and Object Relational Columnar (ORC). The particular data storage format used to store data in each data repository may depend on characteristics of the type of data stored in the data repository, such as access patterns and update patterns. For example, if data items are frequently added or modified, then a data storage format that allows items to be easily updated or added is desirable.

In an embodiment, the first data repository 132 stores data in a Kudu data format. Kudu is a relational columnar storage format that is easily updatable, which allows data items to be easily inserted, updated and/or deleted. Each row in a column may be updated individually. A Kudu data format may be used to store data that requires frequent additions, deletions, and/or updates.

In an embodiment, the second data repository 134 stores data in a Parquet data format. Parquet is a non-relational columnar storage format that stores data as plurality of data files, and each data file of the plurality is stored in association with a respective schema file that defines the schema of the data stored in the data file. Each file may be associated with a particular data table. Additional tables may be added by adding a new data file and schema file.

Additionally, tables stored in a Parquet data format may be merged by merging the associated schema files. Thus, a query across separate tables may be processed by merging the schema files associated with the separate tables and querying the combined schema. However, to modify data items for data stored in Parquet, the entire file is updated. A Parquet data format may be used to store data that does not require many updates or requires mostly bulk updates. Additionally or alternatively, a Parquet data format may be used to store data that requires frequent schema updates.

3.0 Pre-Computed Views

In an embodiment, computer system 100 generates a plurality of pre-computed views and stores the pre-computed views in data storage system 130. The pre-computed views may be stored in an existing data repository, such as data repository 132 and data repository 134, or may be stored in a separate data repository. The pre-computed view may be stored in the same data storage format as the data repository it is stored in. For example, if data repository 134 stores data in a Parquet data format and a pre-computed view is stored in data repository 134, then the pre-computed view is also stored in a Parquet data format. Additionally or alternatively, the data storage format in which the pre-computed view is stored is based on a data storage format of the data from which the pre-computed view is generated.

In an embodiment, a pre-computed view is a result from pre-joining one or more existing data tables. For example, a pre-computed view may combine data from two or more of the plurality of data repositories. The pre-computed view may include a first set of data from data repository 132 and a second set of data from data repository 134.

Additionally, the first and second data set may be stored in different data storage formats. For example, the first set of data may be stored in a first data storage format and the second set of data may be stored in a second data storage format that is different from the first. The resulting pre-computed view may be stored in either the first data storage format or the second data storage format. The clustered computing instances 125 may execute a data framework that is able to join data stored in different storage formats.

In an embodiment, the portions of data from each data repository that is included in a pre-computed view is based on one or more search query requirements. For example, a pre-computed view may be generated to address particular types of queries expected to be received by computer system 100. Referring to the above example where the system stores restaurant and review data, a pre-computed view may combine restaurants with their respective review data. Generating the plurality of pre-computed views may be based on, for example, an example query, user input indicating a particular pre-computed view, a configuration file, or other methods for indicating what data should be included in the particular pre-computed view.

In an embodiment, a pre-computed view may provide an aggregate or summary view comprising aggregated data and/or summarized data. Referring to the above example, a pre-computed summary view may average the user ratings for each restaurant. The summary view may be used, for example, to process a search query specifying restaurants with an average rating of 3/5 or higher.

In an embodiment, one or more pre-computed views are generated when data is first loaded or stored into the system. Additionally, pre-computed views may be generated when the stored data changes. The pre-computed views are immutable and may be stored on the data storage system 130 following a naming convention.

In an embodiment, view metadata corresponding to the pre-computed views is persisted within a persistent context through Spark DataFrames. If a view metadata is not available, then a request to load the metadata is performed. The metadata comprises location and node information within the data storage system 130 for the corresponding pre-computed view, as well as schema information. This metadata allows the view to act as a traditional database table in a non-distributed system and allows low-latency access with low memory overhead. For example, hundreds of thousands of view metadata can easily fit in memory, covering large datasets that would have been impractical or expensive to fit in memory.

4.0 Process Overview

Figure 3:
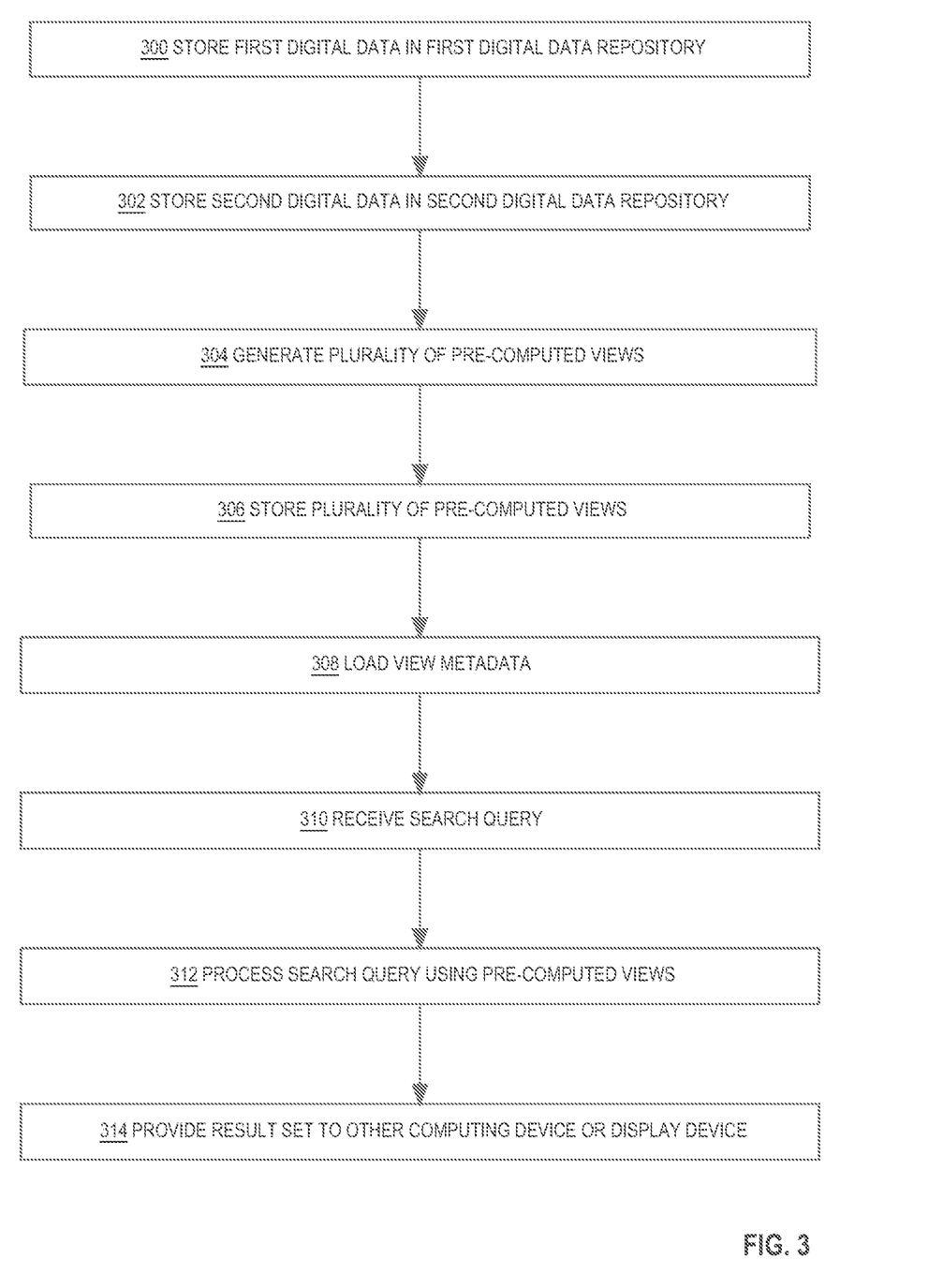
FIG. 3 illustrates a flowchart for providing responses to a search query, according to an embodiment.

FIG. 3 illustrates example steps for providing search results using computer system 100.

At step 300, first digital data is stored in first digital data repository 132 using a first column-oriented storage format. For the purpose of illustrating a clear example, assume the first digital data comprises insurance exposure data. Exposure data stores to information related to insurance contracts, the risks that each insurance contract insures against, and losses that may be incurred if risk events occur. Exposure data may require frequent additions and modifications, but may not require frequent schema additions or modifications since the structure of insurance contracts is relatively consistent. Therefore, the exposure data may be stored in digital data repository 132 using Kudu.

At step 302, second digital data is stored in second digital data repository 134 using a second column-oriented storage format. Assume the second digital data comprises risk item data. The risks described in the exposure data each comprise a plurality of risk items. Risk items may be, for example, property, structures, cars, motorcycles, and other insured items. The risk item data stores information related to the risk items. For example, for property information, risk item data may include property location information, structure information, soil information, and etc. As another example, vehicle information may include vehicle makes and models, and vehicle specification information. Once stored, risk item information does not frequently change, but different types of risk items require different data storage schemas. For example, boats would have a different schema than cars. Therefore, the risk item data may be stored in digital data repository 134 using Parquet.

At step 304, a plurality of pre-computed views are generated based on the first digital data and the second digital data. In an embodiment, a pre-computed view combines digital data that is stored in different storage formats. In the current example, a pre-computed view may combine exposure data, which is stored in Kudu, with risk item data, which is stored in Parquet. A pre-computed view may be generated based on expected searches to be performed on the exposure data and the risk item data. For example, an insurance portfolio may comprise a plurality of contracts, which cover a plurality of risks. Each risk may include a plurality of risk items. Thus, a portfolio view may be generated that joins the plurality of contracts with the plurality of risk items included in the plurality of contracts. As another example, a pre-computed view may be a summary view that indicates the total insured value of each insurance contract based on the risk items associated with the insurance contract.

At step 306, the plurality of pre-computed views are stored in the data storage system 130. In an embodiment, the pre-computed views are stored in the second data repository 134 using the second column-oriented storage format. In the current example, the plurality of pre-computed views are stored in data repository 134 using Parquet.

At step 308, view metadata for the plurality of precomputed views is loaded into the search system. In an embodiment, the loading is performed using Spark DataFrames. The view metadata contains schema and node location information for each pre-computed view of the plurality of pre-computed views.

At step 310, a search query is received by the search system. For example, job server 110 may receive a search query from client computing device 140. The job server may select a particular persistent client connection of one or more persistent client connections for processing the search query.

At step 312, in response to receiving a search query, a result set is determined based on one or more particular pre-computed views of the plurality of pre-computed views. For the purpose of illustrating a clear example, assume computing cluster 120 comprises a plurality of Spark instances, and job server 110 is a Spark Job Server maintaining a plurality of persistent SparkContexts. Job server 110 may receive a search query from client computing device 140. The search query may be, for example, in the form of a database language such as SQL. Job server 110 uses one or more of the SparkContexts to execute the query on one or more Spark instances of the plurality of Spark instances.

Using an execution engine, the pre-loaded view metadata is used to determine the files and node locations on the data storage system 130 in order to select relevant columns. An execution engine may be, for example, Spark, Presto, Impala, and etc. depending on the implementation. Since the underlying data is stored in a columnar format, only the columns of data necessary to satisfy the query is retrieved from the data storage system. This reduces query latency and network traffic, as well as memory overhead from the query engine itself. Complex operations like aggregates, group by's, and user-defined functions are processed by the query engine. Optionally, joins to other data sources like insurance modeling losses can happen at this time, as the data was produced from the original pre-computed views. The execution engine allows joining disparate datasets that could exist in Kudu, Parquet, or even Postgres.

The one or more particular pre-computed views may be determined based on the contents of the search query. For example, if a search query specifies, "all losses for properties that are within five miles of a coastline," then a pre-computed view that stores pre-calculated loss accumulations may be queried, in addition to querying risk item data and/or exposure data that indicates the locations of covered properties.

At step 314, the result set is provided to another computer or a display device. For example, the result set may be provided to client computing device 140, or provided as output to a display device via a graphical user interface. Additionally or alternatively, the result set may be stored in a storage device, such as on data storage system 130.

In an embodiment, storing the first digital data and the second digital data, and generating the plurality of pre-computed views may be performed as batch processes. In addition, the steps may be performed while the system is offline and not connected to any client computing devices or networks. Loading the view metadata, receiving the search query, determining a result set, and providing the search results may be synchronous calls. Additionally, the steps are performed while the system is online and connected to client computing devices and/or networks.

Using these techniques, big data frameworks and storage formats that are typically configured for time-consuming batch processing jobs are able to provide real-time responses to search queries. This allows low-latency searches to be performed using the system described herein. The present system is very flexible by leveraging the significant query plan optimizations of technologies like Spark, and combining it with columnar storage formats, like Parquet and Kudu, in a way that would have required mirroring of data between two complex technologies such as with ElasticSearch and MongoDB or Cassandra. For wide columns sets that are also too large to fit into traditional, relational databases, this architecture provides a fast and distributed way of reading large data sets while providing the minimum overhead in disk and network I/O. Most data storage technologies, including NoSQL databases, require indices and other secondary structures on the data to be determined prior to runtime. However, in the approaches described herein and in the insurance use case, ad hoc querying and data exploration is normal across hundreds of columns. This makes it expensive and impractical to index all columns of information. The benefits of columnar storage technologies with a sophisticated distributed query engine provides a large advantage for risk exploration and analysis over traditional methodologies.

5.0 Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
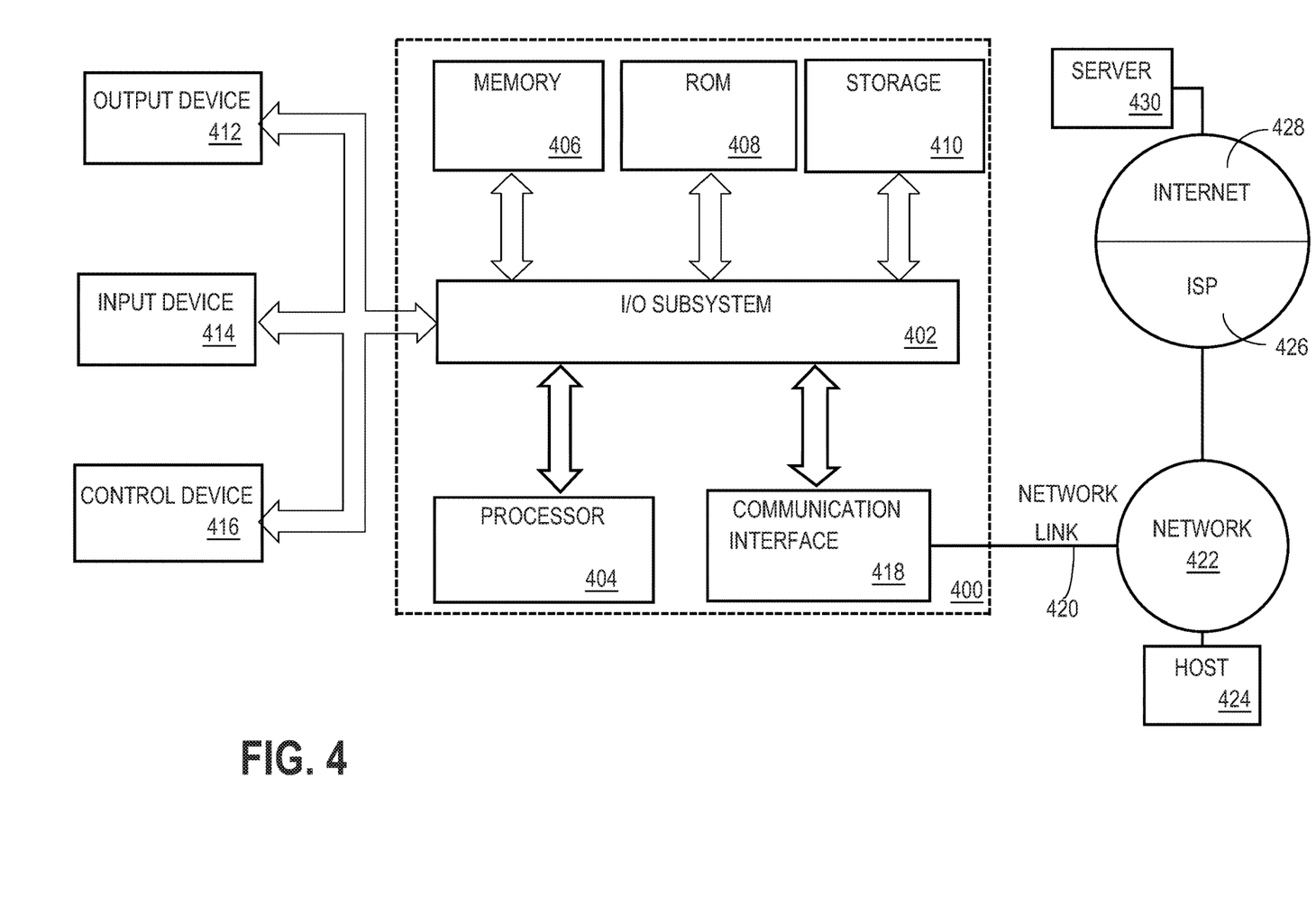
FIG. 4 illustrates a computer system upon which an embodiment may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer-implemented method for providing low-latency responses to queries to a data search system, the method comprising:
  storing first digital data in a first digital data repository using a first column-oriented storage format;
  storing second digital data in a second digital data repository using a second column-oriented storage format, wherein the second column-oriented storage format is different from the first column-oriented storage format;
  generating a plurality of pre-computed views based on both the first digital data and the second digital data;
  storing the plurality of pre-computed views in the second digital data repository using the second column-oriented storage format;
  in response to receiving a search query, determining a result set that is responsive to the query based on one or more particular pre-computed views of the plurality of pre-computed views and providing the result set to another computer or display device as output;
  wherein the method is performed using one or more computing devices.

2. The method of claim 1 wherein the first column-oriented storage format is a Kudu data format.

3. The method of claim 1 wherein the second column-oriented storage format is a Parquet data format.

4. The method of claim 1 wherein first digital data repository and the second digital data repository are stored in a distributed file system.

5. The method of claim 1 wherein the one or more computing devices comprise one or more clustered computing instances managed by a job server.

6. The method of claim 5 further comprising storing, in memory of the job server, persistent connection context data for the one or more clustered computing instances.

7. The method of claim 1:
wherein the first digital data comprises exposure data associated with a plurality of risk exposures, wherein each risk exposure specifies a respective set of risk items;
wherein the second digital data comprises risk item data associated with a plurality of risk items, wherein the plurality of risk items includes at least the specified sets of risk items.

8. The method of claim 7 wherein the risk item data comprises a plurality of risk item types, the method further comprising:
for each risk item type of the plurality of risk item types, storing a respective schema associated with the risk item type;
wherein adding an additional risk item type comprises storing a schema associated with the additional risk item type.

9. The method of claim 8, wherein the query specifies a first risk item type and a second risk item type, the method further comprising:
combining a first schema associated with the first risk item type with a second schema associated with the second risk item type to generate a combined schema;
generating a combined risk item view comprising the first risk item type and the second risk item type using the combined schema;
processing the query based on the combined risk item view.

10. The method of claim 1 wherein generating a pre-computed view comprises joining a first set of data stored using the first column-oriented storage format with a second set of data stored using the second column-oriented storage format.

11. A server computer system that is programmed for providing low-latency search query responses, the system comprising:
a Kudu data repository;
a Parquet data repository;
a plurality of Spark clustered computing instances managed by a Spark cluster manager;
non-transitory computer-readable media storing instructions which, when executed by one or more processors, cause the plurality of Spark clustered computing instances to:
store exposure data in the Kudu data repository;
store risk item data in the Parquet data repository;
generate a plurality of pre-computed views based on the exposure data and the risk item data;
store the plurality of pre-computed views in the Parquet data repository;
in response to receiving a query, process the query based on one or more particular pre-computed views of the plurality of pre-computed views.

12. A server computer system that is programmed for providing low-latency search query responses, the system comprising:
a first digital data repository utilizing a first column-oriented storage format;
a second digital data repository utilizing a second column-oriented storage format, wherein the second column-oriented storage format is different from the first column-oriented storage format;
a plurality of clustered computing instances;
non-transitory computer-readable media storing instructions which, when executed by one or more processors, cause the plurality of computing instances to:
store first digital data in the first digital data repository using the first column-oriented storage format;
store second digital data in the second digital data repository using the second column-oriented storage format;
generate a plurality of pre-computed views based on both the first digital data and the second digital data;
store the plurality of pre-computed views in the second digital data repository using the second column-oriented storage format;
in response to receiving a search query, determine a result set that is responsive to the search query based on one or more particular pre-computed views of the plurality of pre-computed views and provide the result set to another computer or display device as output.

13. The server computer system of claim 12 wherein the first column-oriented storage format is a Kudu data format.

14. The server computer system of claim 12 wherein the second column-oriented storage format is a Parquet data format.

15. The server computer system of claim 12 wherein first data repository and the second digital data repository are stored in a distributed file system.

16. The server computer system of claim 12 where all computing instances in the plurality of clustered computing instances are managed by a job server.

17. The server computer system of claim 16, wherein the job server stores persistent connection context data for the plurality of clustered computing instances.

18. The server computer system of claim 12:
wherein the first digital data comprises exposure data associated with a plurality of risk exposures, wherein each risk exposure specifies a respective set of risk items;
wherein the second digital data comprises risk item data associated with a plurality of risk items, wherein the plurality of risk items includes at least the specified sets of risk items.

19. The server computer system of claim 18 wherein the risk item data comprises a plurality of risk item types, wherein the plurality of clustered computing instances are further configured to:
for each risk item type of the plurality of risk item types, store a respective schema associated with the risk item type;
wherein adding an additional risk item type comprises storing a schema associated with the additional risk item type.

20. The server computer system of claim 19, wherein the search query specifies a first risk item type and a second risk item type, wherein the plurality of clustered computing instances are further configured to:
combine a first schema associated with the first risk item type with a second schema associated with the second risk item type to generate a combined schema;

generate a combined risk item view comprising the first risk item type and the second risk item type using the combined schema;

process the search query based on the combined risk item view.

* * * * *